(12) United States Patent
Reiseder

(10) Patent No.: US 9,096,179 B2
(45) Date of Patent: Aug. 4, 2015

(54) DEPLOYABLE VEHICLE CARGO HITCH CARGO CARRIER

(71) Applicant: Franz Reiseder, St. Albert, CA (US)

(72) Inventor: Franz Reiseder, St. Albert, CA (US)

( * ) Notice: Subject to any disclaimer, the term of this patent is extended or adjusted under 35 U.S.C. 154(b) by 0 days.

(21) Appl. No.: 14/078,575

(22) Filed: Nov. 13, 2013

(65) Prior Publication Data

US 2014/0131407 A1     May 15, 2014

Related U.S. Application Data

(60) Provisional application No. 61/726,881, filed on Nov. 15, 2012.

(51) Int. Cl.
*B60R 9/00* (2006.01)
*B60R 11/00* (2006.01)
*B60R 9/06* (2006.01)

(52) U.S. Cl.
CPC ........... *B60R 9/06* (2013.01); *B60R 2011/0094* (2013.01)

(58) Field of Classification Search
CPC .................................... B60R 9/06; B60R 9/10
USPC .......... 224/519, 521, 532, 535, 523, 524, 527
See application file for complete search history.

(56) References Cited

U.S. PATENT DOCUMENTS

| | | | | |
|---|---|---|---|---|
| 4,046,398 | A * | 9/1977 | Dunwoody | 280/415.1 |
| 4,915,276 | A * | 4/1990 | Devito | 224/521 |
| 5,149,122 | A * | 9/1992 | Helber | 280/491.2 |
| 5,215,234 | A * | 6/1993 | Pasley | 224/508 |
| 5,460,304 | A * | 10/1995 | Porter et al. | 224/521 |
| 5,465,883 | A * | 11/1995 | Woodward | 224/495 |
| 5,586,702 | A * | 12/1996 | Sadler | 224/521 |
| 5,699,985 | A * | 12/1997 | Vogel | 224/564 |
| 5,881,937 | A * | 3/1999 | Sadler | 224/509 |
| 5,884,930 | A * | 3/1999 | Cluth | 280/497 |
| 6,089,431 | A * | 7/2000 | Heyworth | 224/521 |
| 6,125,945 | A * | 10/2000 | Skaggs et al. | 172/439 |
| 6,145,720 | A | 11/2000 | Comeau | |
| 6,293,451 | B1 | 9/2001 | LeMay et al. | |
| 6,502,730 | B2 * | 1/2003 | Johnson | 224/519 |
| 6,524,054 | B2 * | 2/2003 | Maney | 414/462 |
| 6,742,799 | B1 * | 6/2004 | Hansen | 280/495 |
| 6,802,441 | B1 * | 10/2004 | DuRant et al. | 224/513 |
| 6,814,366 | B2 * | 11/2004 | McCoy et al. | 280/495 |
| 7,992,751 | B1 * | 8/2011 | Sweeney | 224/497 |
| 8,079,611 | B2 * | 12/2011 | Schroeder | 280/491.5 |
| 2003/0155390 | A1 * | 8/2003 | Williams et al. | 224/521 |
| 2004/0012170 | A1 * | 1/2004 | McCoy | 280/495 |
| 2006/0091172 | A1 * | 5/2006 | Gray et al. | 224/519 |
| 2006/0261111 | A1 * | 11/2006 | McCoy et al. | 224/499 |
| 2009/0314813 | A1 * | 12/2009 | Woolery | 224/183 |

* cited by examiner

*Primary Examiner* — Justin Larson
*Assistant Examiner* — Lester L Vanterpool
(74) *Attorney, Agent, or Firm* — Daniel Boudwin; Global Intellectual Property Agency LLC

(57) ABSTRACT

A cargo carrier assembly attachable to a vehicle cargo hitch is provided that deploys therefrom and supports cargo items from the rear of the vehicle during transport. The assembly comprises a T-shaped member slidably engaged to a trailer hitch receiver. The T-shaped member comprises a crossbar with a first and second support member end. The support member ends comprises a bar member support sleeve below a slat member support sleeve, wherein a pair of bar members or slat members can be extended from the sleeves and secured under different cargo items. The extended slats engage tubular sleeve members affixed to the base of cargo items, while the bar members are adapted to support larger cargo items or a cargo tray thereon. Magnetic pins engage the slats to maintain their deployed position, while threaded hand fasteners secure the bar members when deployed. A hinged cover plate shrouds the assembly during non-use.

11 Claims, 8 Drawing Sheets

DEPLOYABLE VEHICLE CARGO HITCH CARGO CARRIER

CROSS REFERENCE TO RELATED APPLICATION

This application claims the benefit of U.S. Provisional Application No. 61/726,881 filed on Nov. 15, 2012, entitled "Pin-Free Retractable Cargo Hitch." The above identified patent application is herein incorporated by reference in its entirety to provide continuity of disclosure.

BACKGROUND OF THE INVENTION

1. Field of the Invention

The present invention relates to cargo carriers and assemblies that are supported from a vehicle trailer hitch receiver. More specifically, the present invention pertains to a new and novel cargo carrier assembly that is supported from the cargo hitch receiver of a vehicle and includes an expandable structure for supporting different types of cargo, wherein the device stows when not in use and is deployed without tools. The overall assembly is slidably positioned within a cargo hitch receiver and is chained thereto, wherein the assembly can be stowed beneath the vehicle or extended therefrom into a working state and secured in a static position.

Transporting cargo or bulky items from one location to another requires sufficient capacity within the vehicle or a vehicle specifically suited for carrying the given cargo, such as a pickup truck or similarly large vehicle. For those that own smaller vehicles or for those who have already filled the interior cargo areas of their vehicle, a common solution is a tailgate mounted cargo carrier or trailer. The present invention relates to tailgate mounted cargo carriers that are supported by a tailgate hitch receiver and extend rearward to form a cargo area for the support of bulky items, container, luggage, and other items such as bikes and strollers.

Most commonly available cargo carriers are supported by the cargo hitch receiver along the rear of the vehicle and extend outward. These assemblies are generally static in nature and are either extendedly supported when in use or completely removed when not. This requires the user to stow the cargo carrier when not in use, or maintain the same at an extended position along the rear of the vehicle, which is not always convenient for parking or safe in a rear-end collision. Devices in the art include cargo carrier improvements that allow the cargo carrier to be rotated or stowed against the vehicle when in use, or similarly disclose a kinematic coupling that allows for rotation of the carrier to different positions. However, these devices fail to provide a cargo carrier that is completely stowable under the vehicle when not in use, and furthermore one that requires no tools for assembly when deploying the stowed carrier.

The present invention introduces a new and novel cargo carrier that is supported by a tailgate hitch receiver along the rear of a vehicle, wherein the device stows beneath the vehicle when not in use, and provides extendable support members that are locked into place using a series of securable pins. The support members include slat members that can engage slat-receiving slots mounted on carried luggage, and furthermore bar members that are capable of supporting heavier loads or a cargo tray thereon. The support members are deployed using a series of pins and hand turn fasteners, wherein the members slide in and out of the ends of a T-shaped frame attached to the tailgate hitch receiver. The assembly functions to increase the cargo capacity of vehicle in a simple and useful manner, and provide a structure that readily stows under the vehicle when not in use. The overall assembly is slidably engaged to a trailer hitch receiver to allow the assembly to slide beneath the car when not in use and extend outward therefrom into a working state offset from the rear bumper of the vehicle. A chain prevents the hitch tube and hitch receiver from separating, while fasteners secure the hitch tube in a static relationship with the hitch receiver during use.

2. Description of the Prior Art

Devices have been disclosed in the prior art that relate to vehicle cargo carriers. These include devices that have been patented and published in patent application publications, and generally relate to sophisticated and bulky carrier assemblies that do not readily condense into a stowed state when not in use. The present invention contemplates a cargo carrier that utilizes extendable slats and bar members during use, wherein the slats and bars can be stowed within the device or removed therefrom when not in use. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Patent Publication No. 2003/0155390 to Williams, which discloses a cargo carrier that mounts to the hitch of a vehicle, wherein the carrier comprises a pair of parallel cylindrical tubes extending from a connection frame adapted to be mounted on the vehicle hitch. A carrier frame secures over the parallel tubes by way of two hollow cylindrical members, wherefrom support members extend laterally outward and provide a platform for placement of articles thereon. Several embodiments are disclosed for the tubes and the carrier frame, wherein the carrier frame accepts a portion of the connection frame therein for extending the carrier frame from the rear of a vehicle to support items thereon. The present invention contemplates slidable slat members that engage corresponding slat receiving members along the base of an article of luggage, or alternatively a larger frame member. The present invention utilizes a quick deployment method that does not require tools to move the assembly from a stowed state to a working state.

U.S. Pat. No. 7,992,751 to Sweeney is another device of the prior art that discloses a cargo carrier mountable to a trailer hitch that comprises a hitch bar perpendicularly mounted to a two-piece, tubular assembly that is expandable into a luggage carrier. The two halves of the tubular assembly separate and are connected via link members that connect to the two halves and facilitate separation thereof. Rigid brackets and plate members secure between the expanded halves to create a carrier frame upon which luggage and other articles can be sustained and secured. The Sweeney device discloses an expandable trailer hitch luggage carrier device; however its elements are quite unique and do not anticipate or teach the deployable assembly of the present invention. The present invention is outwardly slidable from the trailer hitch and adjustable to accommodate different types of luggage articles, however the present invention does not contemplate an expandable, tubular assembly as taught by the Sweeney device.

U.S. Pat. No. 5,586,702 to Sadler discloses a trailer hitch mountable cargo carrier that comprises a frame member that is slidably retractable from the vehicle via a telescoping connection with the trailer hitch receiver. The connection member comprises an open bar structure having a telescoping construction with several other bar structures aligned therewith such that the frame member can be extended away from the trailer hitch to accommodate larger cargo items thereon. While providing an assembly that can be extended from the vehicle and support cargo thereon, the Sadler device fails to provide a means for completely concealing the assembly when not in use. The present invention is slidable from under the vehicle and includes a cover thereover when not in use, while slat members extend from a T-shaped fame attached to the vehicle hitch receiver. The present invention provides the capability of supporting loads outward from the rear of the vehicle, wherein the cargo can be of larger or smaller dimension and the underlying support is adjusted in outward length to accommodate the same.

Finally, U.S. Pat. No. 6,145,720 to Comeau discloses a vehicle cargo carrier that supports a cargo container in a pivotal relationship with respect to a vehicle cargo hitch receiver. A T-shaped frame secures to the vehicle hitch receiver and supports a luggage article thereon, wherein the luggage container is pivotably connected to the frame to allow the container to be rotated from a vertical to a horizontal position. Similar to the aforementioned prior art assemblies, the Comeau device fails to anticipate or suggest the cargo carrier assembly of the present invention. The present invention comprises a T-shaped frame from which slats extend to support luggage articles thereon. Bar members can also be extended to form the T-shaped frame to support larger assemblies or a platform upon which heavier or more bulky cargo can be carried.

The present invention discloses a T-shaped cargo carrier assembly that attaches to a vehicle trailer hitch and can deploy one of two support members therefrom for carrying cargo along the rear of a vehicle. The support members comprise slat members and bar members that slidably extend from a T-shaped member and are deployed therefrom without the assistance of tools. The slat members are adapted to secure through slat-receiving sleeve members along the base of certain cargo items, while the more robust bar members support heavier cargo items therefrom. Once loaded, the cargo is tethered to the assembly using cargo straps for ensured stability during transport. To deploy the support members of the present invention, magnetic pins and hand-turn fasteners are utilized.

Overall, the present invention provides a readily deployable cargo carrier structure that requires no storage of assemblies between use and readily deploys from a stowed state below the vehicle. It is submitted that the present invention substantially diverges in design elements from the prior art, and consequently it is clear that there is a need in the art for an improvement to existing cargo carrier devices. In this regard the instant invention substantially fulfills these needs.

SUMMARY OF THE INVENTION

In view of the foregoing disadvantages inherent in the known types of vehicle mounted cargo carrier assemblies now present in the prior art, the present invention provides a new cargo carrier that can be utilized for providing convenience for the user when supporting cargo from the trailer hitch receiver of the vehicle using a readily deployable and modular support assembly.

It is therefore an object of the present invention to provide a new and improved vehicle mounted cargo carrier assembly that has all of the advantages of the prior art and none of the disadvantages.

It is another object of the present invention to provide a vehicle mounted cargo carrier assembly that includes a T-shaped member that secures to a vehicle trailer hitch receiver and operably supports two distinct cargo support members therefrom, wherein the support members can be deployed from the T-shaped member ends without the use of tools and without securing a larger assembly thereto.

Another object of the present invention is to provide a vehicle mounted cargo carrier assembly that utilizes magnetic pins and hand-turn fasteners to deploy the cargo support members and lock the same in a static position with respect to the T-shaped member.

Yet another object of the present invention is to provide a vehicle mounted cargo carrier assembly that stows along the tailgate region of a vehicle when not in use and requires no separate assemblies that are otherwise difficult to store between uses.

Another object of the present invention is to provide a vehicle mounted cargo carrier assembly that includes a cover panel that is hinged to the T-shaped member and secures over the assembly when stowed, shrouding its presence between uses.

Another object of the present invention is to provide a vehicle mounted cargo carrier assembly that provides a support upon which heavy cargo can be placed, while cargo strap locations are provided to further secure the cargo to the assembly during transport.

Another object of the present invention is to provide a vehicle mounted cargo carrier assembly that slidably engages a trailer hitch receiver and can extend therefrom or collapse thereagainst and below the rear bumper of a vehicle. The present invention contemplates a sliding relationship between the hitch receiver and hitch tube to position the support members in an offset location with respect to the rear of the vehicle during use.

A final object of the present invention is to provide a vehicle mounted cargo carrier assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
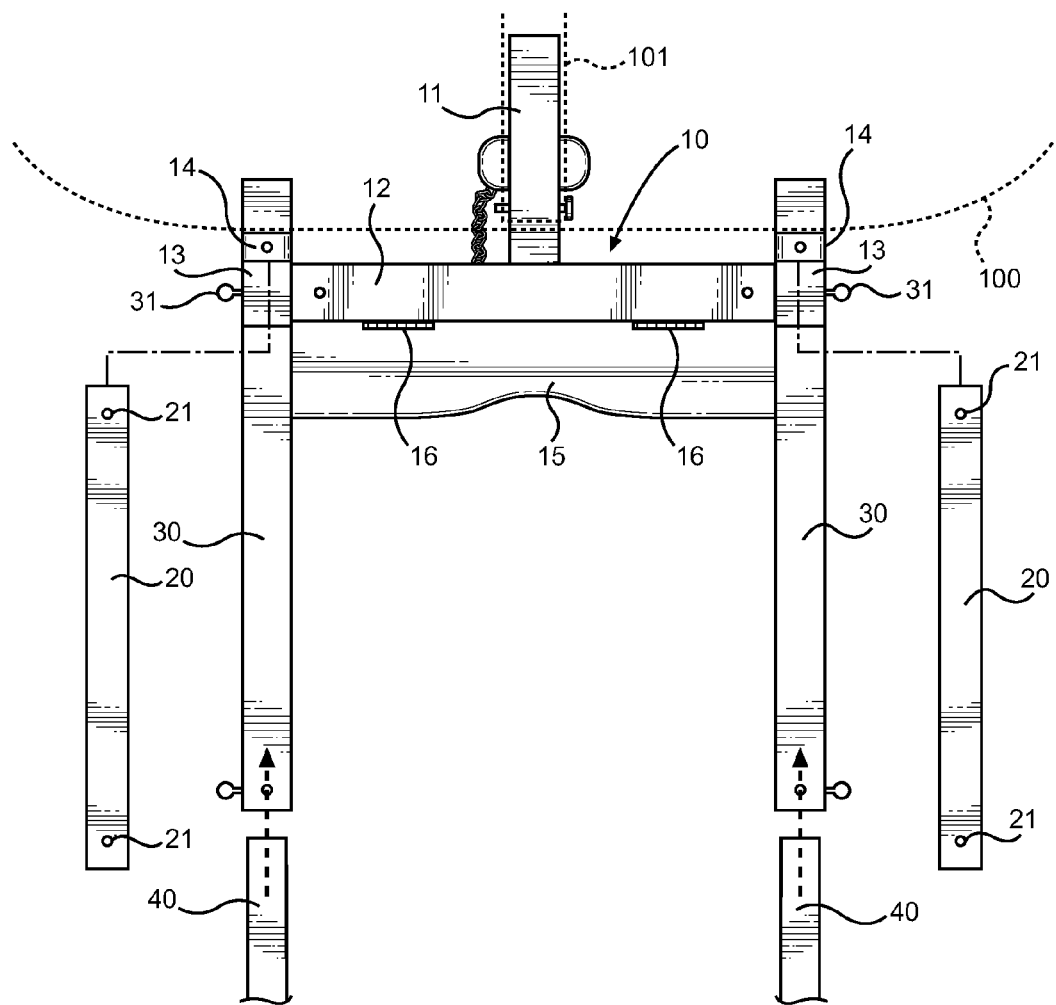
FIG. 1 shows an overhead view of the cargo carrier assembly of the present invention in an exploded state.

Reference is made herein to the attached drawings. Like reference numerals are used throughout the drawings to depict like or similar elements of the vehicle mounted cargo carrier. For the purposes of presenting a brief and clear description of the present invention, the preferred embodiment will be discussed as used for supporting cargo from the trailer hitch receiver of a vehicle using one of two support members that are stowable and deployable from below the vehicle. The figures are intended for representative purposes only and should not be considered to be limiting in any respect.

Referring now to FIG. 1, there is shown an overhead view of the vehicle mounted cargo carrier of the present invention, wherein the elements of the assembly are shown in an exploded state. The cargo carrier comprises a T-shaped member 10 having a trailer hitch tube 11 and a crossbar member 12 with a pair of support member ends. The trailer hitch tube 11 is received within the trailer hitch receiver 101 of the vehicle 100 and chained thereto such that the hitch tube 11 and hitch receiver 101 do not completely separate. The hitch tube 11 and the hitch receiver 101 are in a sliding relationship with one another to allow the crossbar member 12 to be operably positioned relative to the rear bumper of the vehicle 100. The T-shaped member 10 slides into and from the hitch receiver 101 and can be fastened thereto using hand turn fasteners to secure the assembly in a static relationship. The chain securing the assembly is attached to the T-shaped member crossbar 12 at one end and to the vehicle hitch at an opposite end. The sliding relationship allows the T-shaped member of the assembly to be positioned outward from the bumper of the vehicle 100 and allows the user to operably stow the assembly during non-use.

The support member ends of the crossbar member 12 each include a pair of sleeves through which to support a slat member 20 and a bar member 30 therethrough. A slat receiving sleeve 14 is disposed above a bar member receiving sleeve 13, wherein the respective members slide therethrough and are secured therein while supporting weight outward from the vehicle bumper. Specifically, a pair of slat members 20 slide through the slat receiving sleeves 14 and are pinned into place through aligned fastener holes in the sleeve 14 and along the slat 21. When pinned, the slats 20 are cantilevered from the sleeves 14 and can support weight from the crossbar member 12 as the slats 20 bear against the sleeves 20 while loaded. When stowed, the slats can be withdrawn below the vehicle bumper or completely removed and stowed against the crossbar member 12.

The slat members 20 are suitable for supporting luggage items and larger bags, however the bar members 30 are more robust structures that can support larger cargo loads thereon. The slats 20 are adapted to be received through sleeves positioned on the luggage itself (FIG. 5.), while the bar members 30 are adapted to support bulkier and heavier loads (FIG. 6.), or alternatively support a cargo tray thereon (FIG. 7). The bar members 30, like the slat members 20, are slidably supported within their respective sleeves 12 and are fastened into place using hand turn fasteners 31 disposed through the sleeves 13. These fasteners 31 prevent the bar members 30 from moving within the sleeves 13 while in a working state, and require no tools to operate (e.g. winged fasteners or similar hand turn fastener construction).

Figure 2A:
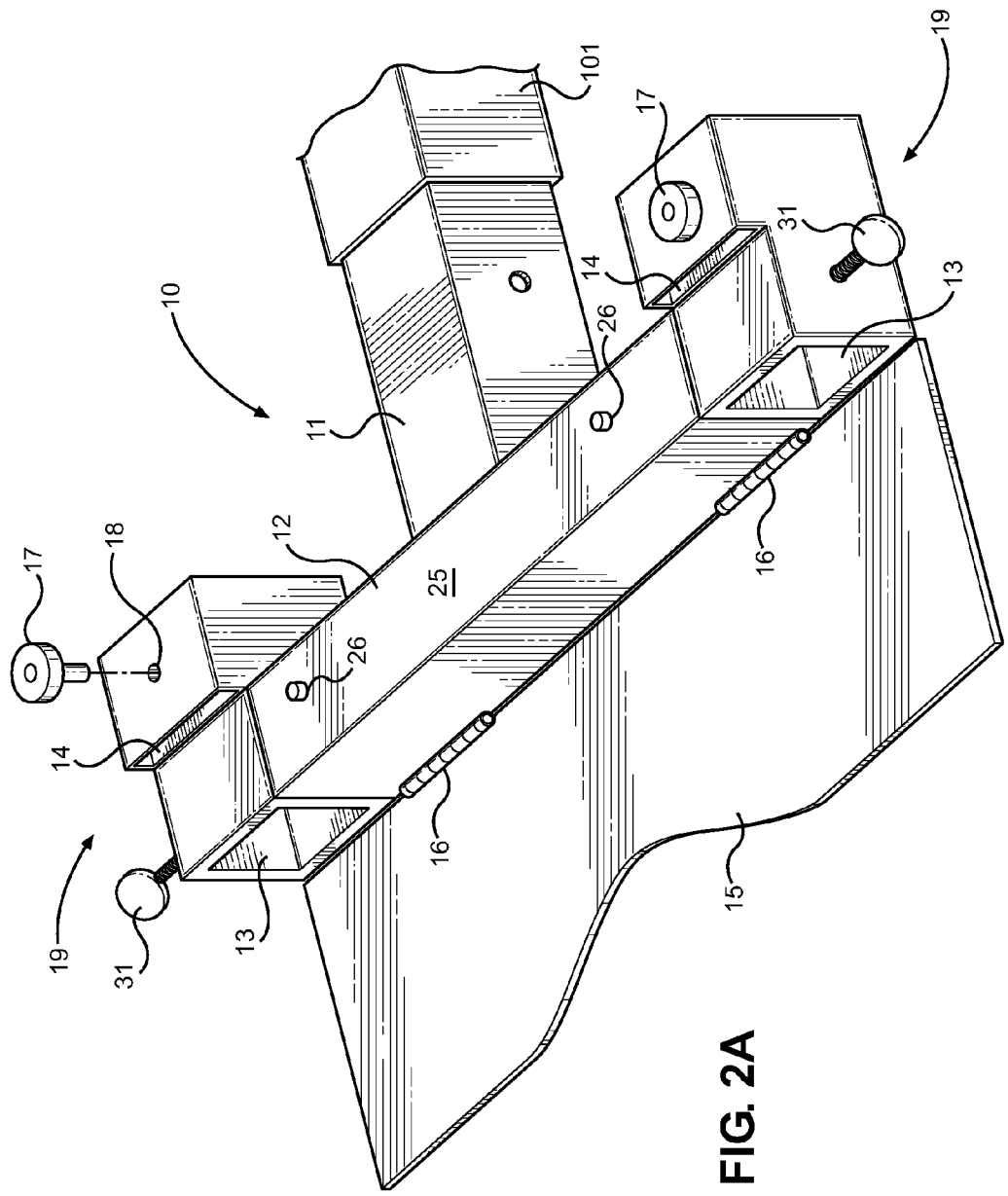
FIG. 2A shows a perspective view of the T-shaped member of the present invention.

Referring now to FIGS. 1 and 2, the T-shaped member 10 is shown in greater detail. The T-shaped member 10 is adapted to be supported by a tailgate hitch receiver 101 via the hitch tube 11, wherein the member 10 can remain thereattached while carrying cargo and during periods therebetween in which cargo carriage may not be required. During these periods of non-use, a cover plate 15 is utilized to shroud the T-shaped member 10. The cover plate 15 is connected to the crossbar member 12 via at least one hinge joint 16, wherein the cover plate 15 can be rotated from an upstanding (assembly non-use) state, to a lowered (assembly in-use) state. FIGS. 1 and 2 illustrate the cover plate 15 in a lowered state.

FIG. 2 further illustrates the construction of the support member ends 19 of the crossbar member 12, wherein a bar member receiving sleeve 13 and a slat receiving sleeve 14 are disposed in a stacked configuration. The sleeves comprise elongated apertures that allow their respective members to slide therethrough before being fastened into place. Once loaded with cargo, the vertical shear load and moment created at the end of the members is supported by the sleeves themselves, whereby the members are cantilevered from the crossbar member 12. To secure the slat members in the sleeve 14, it is contemplated that a magnetic pin 17 can be utilized. The pin 17 is secured through a sleeve fastening aperture 18 along the upper surface of the slat receiving sleeve 14 and through an aperture in the slat. The magnetized pin 17 is attracted to the sleeve upper surface, while then pin dowel member prevents the slat from sliding within the sleeve 14. Since the pin 17 does not support any vertical load, the magnetic attraction alone secures the pin 17 in the aperture 18, while vertical loads are reacted by the sleeve 14. The use of a magnetic pin 17 is desired for ease of deployment of the slat member, wherein tools are not required to deploy or stow the assembly.

Figure 2B:
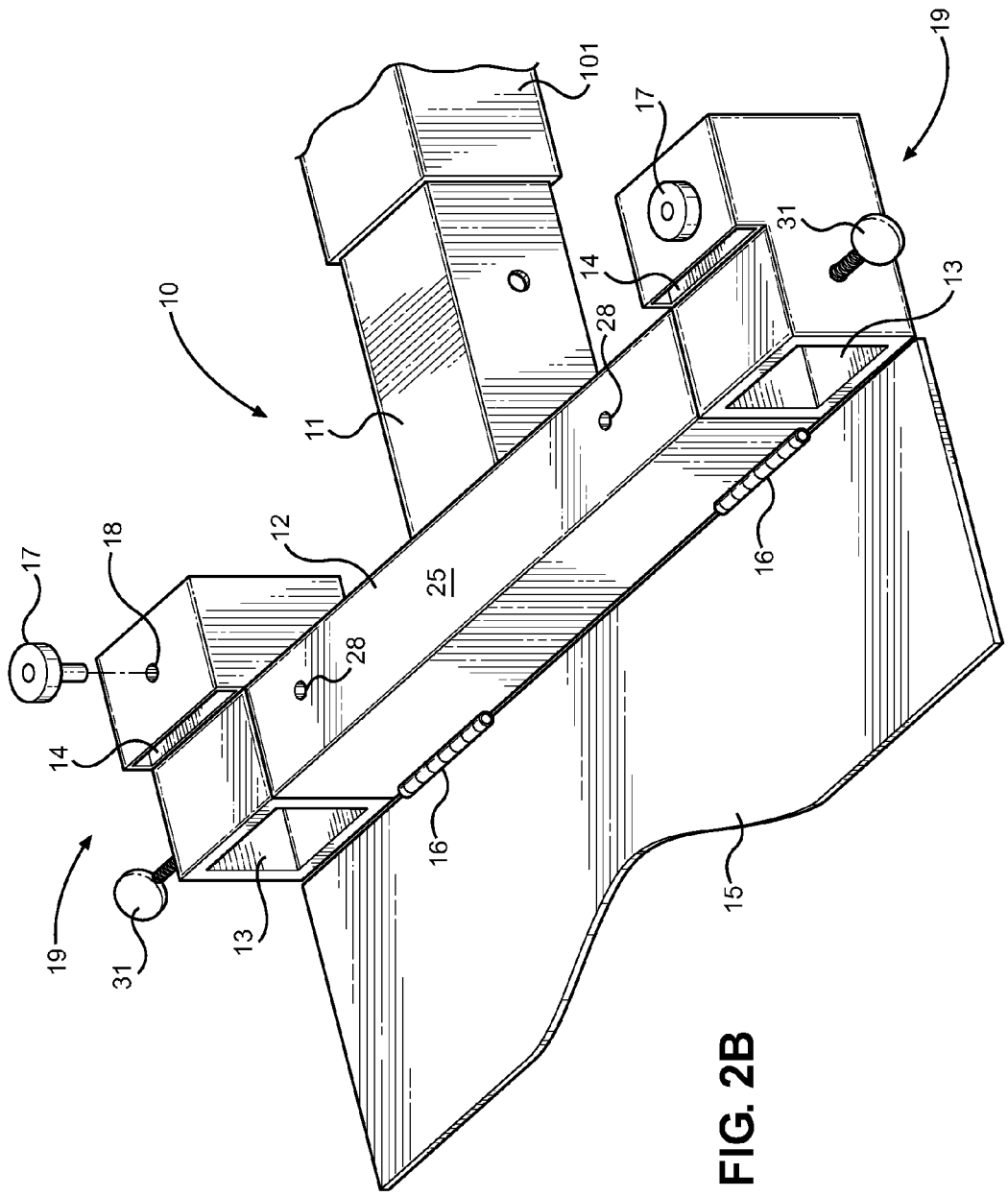
FIG. 2B shows a perspective view of the T-shaped member of the present invention, wherein the crossbar member has fastening apertures.

When the slat members are not deployed through their respective sleeves 14, they can be positioned under the vehicle and through the sleeves 14 or removed and secured along the upper surface 25 of the crossbar member 12. The magnetic fasteners (17) secure the slates thereto through crossbar member fastening apertures 28, as shown in FIG. 2B, or alternatively (and shown in FIG. 2A), a pair of upstanding pins (26) secures the slats along the crossbar member (12). The slats are overlaid upon one another and either fastened to the crossbar or received by the pins. The pins 26 are received through a pair of slat member apertures such that the members remain attached to the crossbar member 12 while not in use.

Similar to the slat members, the bar members are fastenably secured within their respective sleeves 13 when deployed. The contemplated fastener therefor is either the magnetic fastener of the slats, or a threaded hand turn fastener 31. The fastener is supported through a sleeve fastening aperture through the sleeve 13 and prevents sliding motion of the member therein and while supporting the weight of the cargo.

Figure 3:
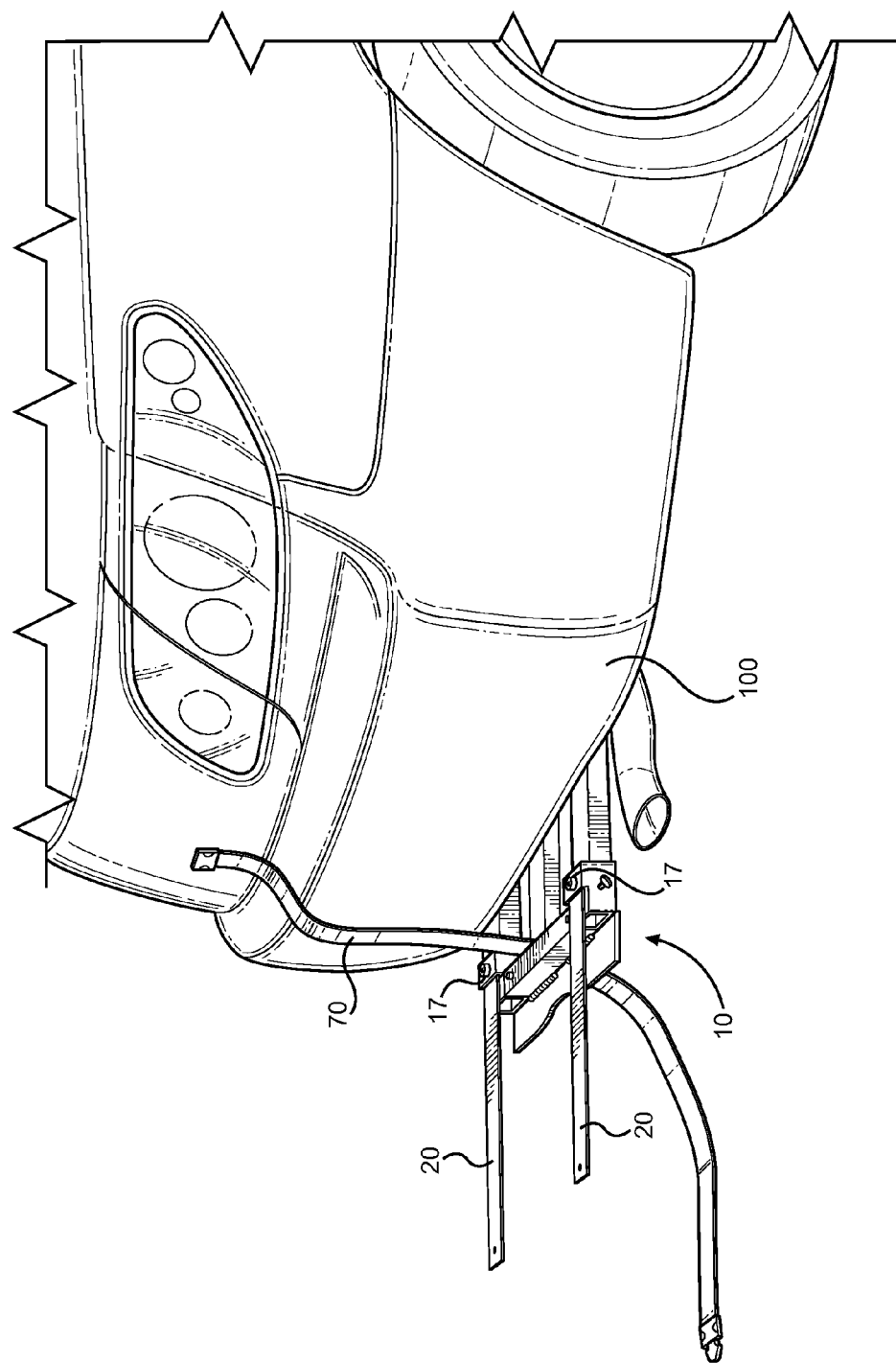
FIG. 3 shows a view of the slat members deployed from the T-shaped member of the present invention.

Referring now to FIG. 3, there is shown a view of the vehicle mounted cargo carrier of the present invention in a working state, whereby the slat members 20 are supported from the slat member receiving sleeves. In this extended position, the slats 20 are adapted to be fed through elongated cargo sleeves along the base of cargo items, wherein the cargo sleeves are fastened or similarly attached to the cargo and receive the slats therethrough. The slats 20 are supported by the receiving sleeves of the crossbar member and by the magnetic pins 17, wherein the load of the cargo bears against the slat length. To prevent the cargo from sliding off of the end of the slats, a cargo strap 70 is utilized to wrap around the cargo and secure the same to the T-shaped member 10. Once secured by the strap 70 and supported by the slats 20, the cargo is firmly secured against the vehicle 100 for transport to a desired location. Ideally the slats are for luggage items and bulky items (e.g. hockey bags, large suitcases, containers, etc.).

Figure 4:
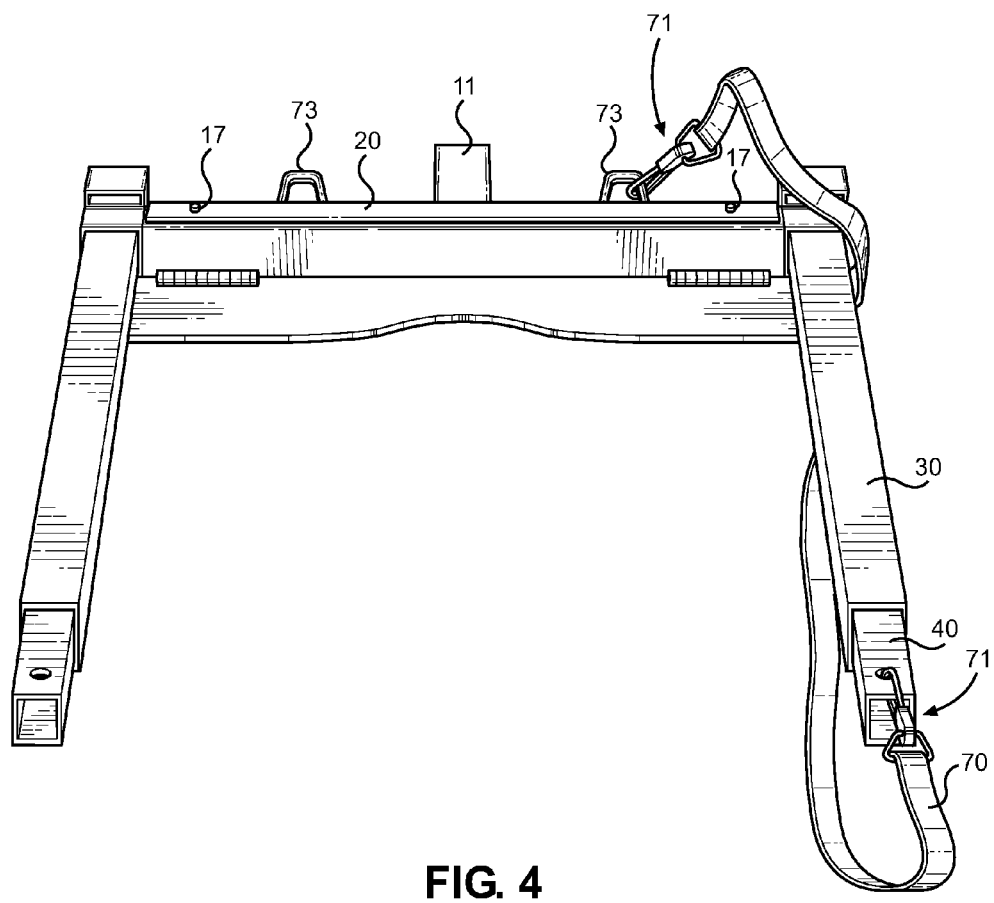
FIG. 4 shows an overhead perspective view of the T-shaped member of the present invention, wherein the slat members are stowed and the bar members are extendedly supported therefrom.

Referring now to FIG. 4, there is shown an overhead perspective view of the present invention, wherein the pair of bar members 30 are extendedly supported from the T-shaped member. The bar members 30 are preferably tubular members that slide in and out of their respective sleeves and are fastened thereto. FIG. 4 shows an embodiment of the present invention, wherein a second telescoping bar member set 40 is provided in the first set of the bar members 30. This second bar member set 40 is fastened to the first and extends the overall length of the bar member support from the crossbar member. Once positioned at an extended position, cargo supported on the bar members 30, 40 can be secured thereto with a tether 70. The tether can secure around the crossbar member and the cargo only, or be clipped 71 by apertures in the bar member and by cargo tie down loops 73 along the rear of the crossbar member. The tether secures the cargo and prevents any relative movement during transport. FIG. 4 also shows the slat members 20 in a stowed state and supported along the crossbar member via the upstanding pins 17.

Figure 5:
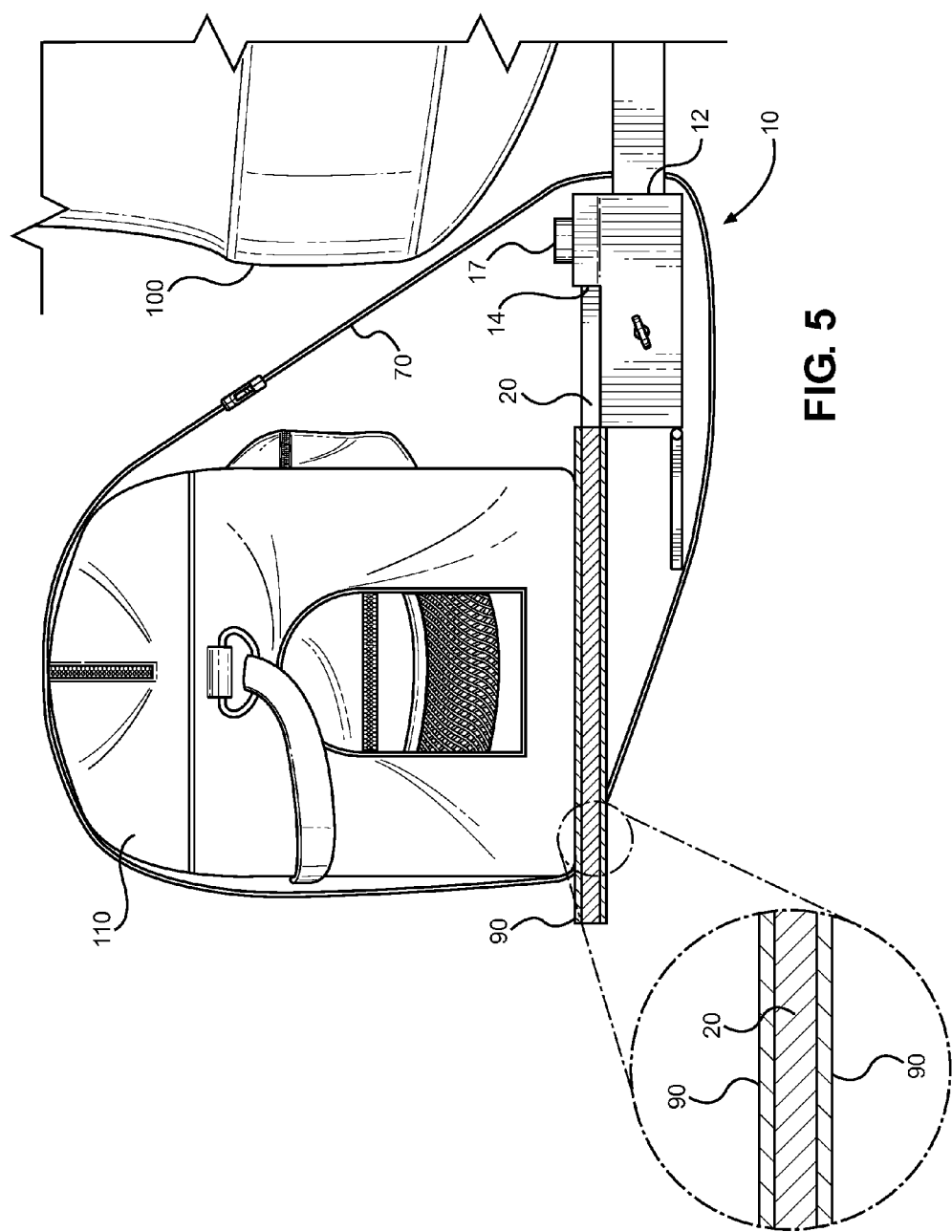
FIG. 5 shows a side view of the present invention, wherein the slat members are supporting a cargo item via slat receiving members secured to the base of the cargo item.
Figure 6:
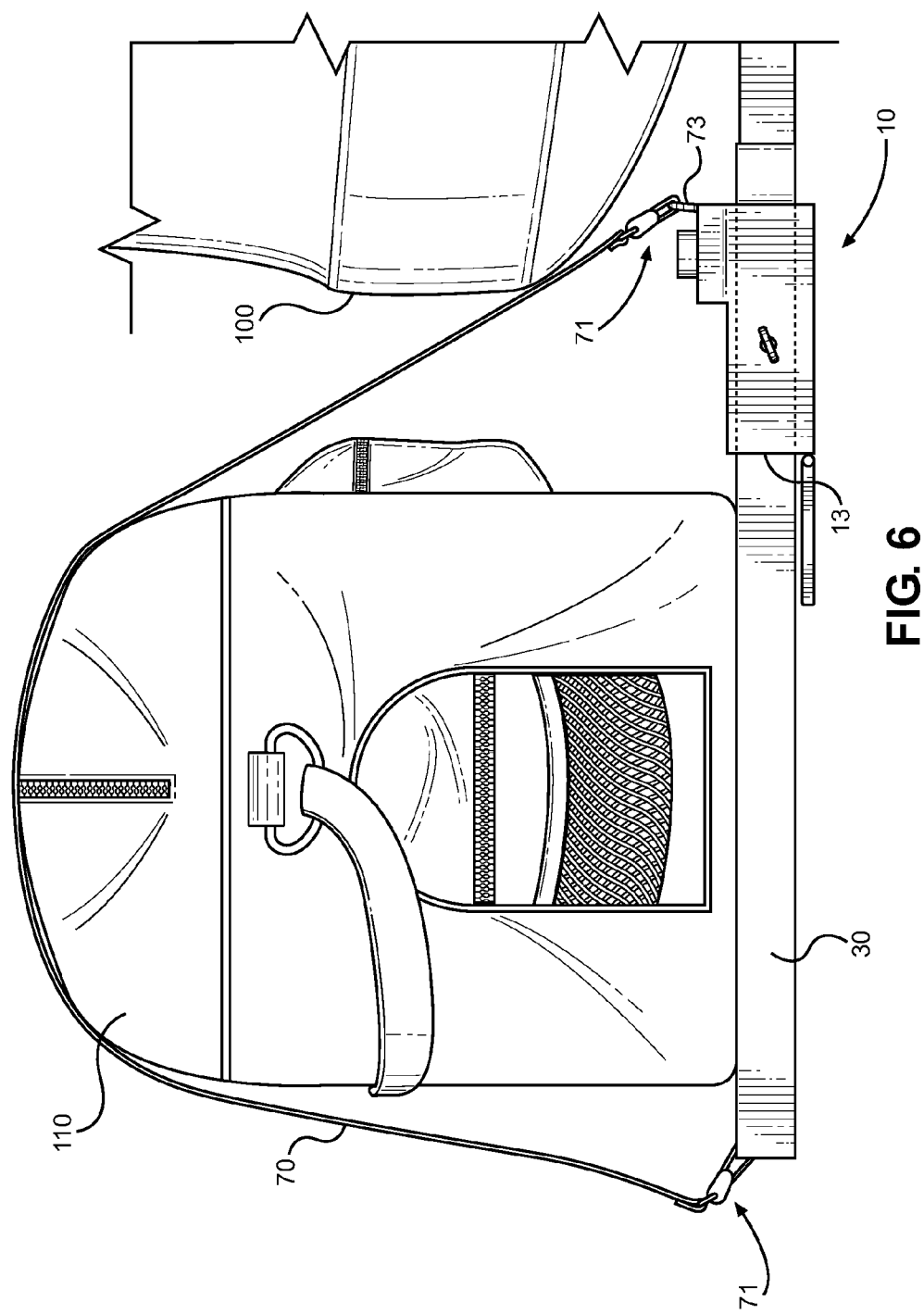
FIG. 6 shows a side view of the present invention, wherein the bar members are supporting a cargo item thereunder.
Figure 7:
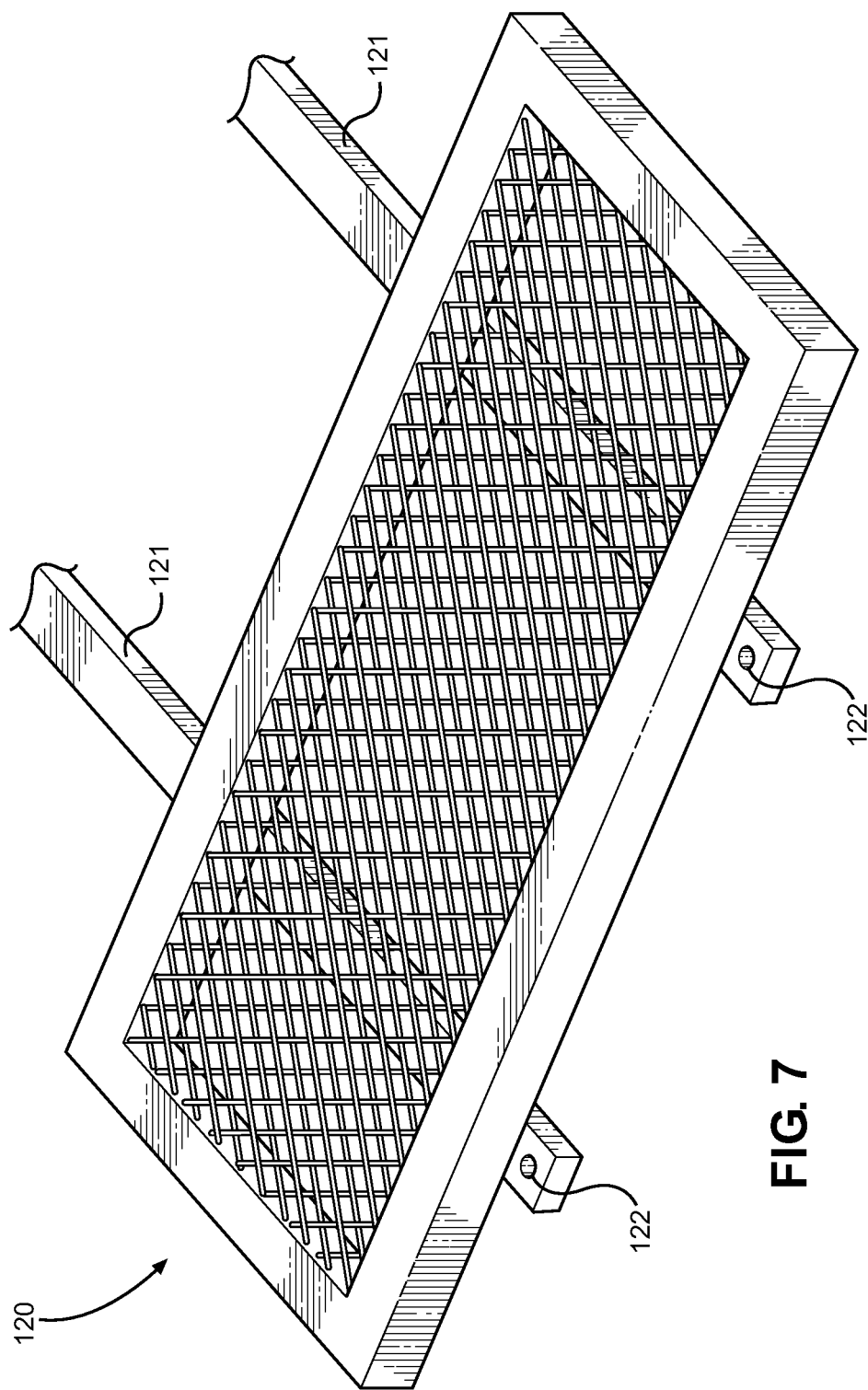
FIG. 7 shows a tray attachment that is securable to the T-shaped member to provide a larger platform upon which to support cargo therefrom.

Referring now to FIGS. 5 and 6, there are shown two views of a cargo item 110 being supported by the slat members 20 and the bar members 30, respectively. For cargo items 110 that are frequently carried, slat receiving cargo sleeves 90 can be attached to the base of the cargo item. The cargo sleeves 90 receive the slats 20 therethrough as the cargo item 110 is slid into position. Once the slat members 20 are received by the cargo sleeves 90, the cargo item 110 is then strapped to the T-shaped member 10 via a cargo tether 70. The slats 20 are supported within the slat receiving sleeves 14 of the crossbar member 12, and the magnetic pins 17 sustain the position of the slats therein. Once secured, the cargo item 110 remains stationary with respect to the vehicle 100 during transport.

For heavier cargo items, the bar members 30 can be deployed from the T-shaped member. The bar members 30 are slidably supported by the bar member sleeves 13 and are pinned into location. Once the cargo 110 is loaded thereon, the cargo 110 is strapped 70 thereto via a looped tether (FIG. 5) or a tether 70 that is clipped 71 to the bar member ends and the cargo tie down loops 73.

Referring now to FIG. 7, there is shown an accessory attachment suitable to be supported by the present invention and contemplated as an optional assembly. When supporting several cargo items from the T-shaped member of the present invention, a cargo tray attachment 120 is more suitable. The cargo tray comprises an elongated surface upon which cargo items can be positioned, whereunder a pair of cargo tray bar members 121 are attached thereto. The cargo tray bar members 121 are the same as those previously described, and are adapted to be received by the same bar member sleeves of the crossbar member support ends. Cargo can be supported and tethered to the tray 120, while the ends of the bar members may also include clip apertures 122 for attaching cargo tethers thereto. It is contemplated that the tray accessory attachment is an optional assembly that is kept at home when not in use and deployed when desired.

Luggage and sports equipment take up a considerable amount of space in a vehicle. This can be especially problematic for smaller vehicles, such as sports cars and convertibles, which have limited space. In addition, it is well known that with any size car, the more items people pack in the vehicle, the less space they have. Traditional hitches utilize complicated tie down straps, and cannot be easily stored away. An effective solution is needed to help people haul items on the back of a vehicle, without taking up a lot of space.

The present invention describes a vehicle cargo hitch attachment. The device comprises a T-shaped member that supports various cargo support members therefrom, each of which being capable of sliding under the vehicle or removed therefrom when not in use. The present assembly can be used to support luggage, hockey equipment, or a variety of other items thereon while in transport, wherein the assembly does not require tools to deploy and can stow tidily under the vehicle when not in use. The present invention provides an easy and convenient way to haul luggage, sports equipment, and cargo on the back of a vehicle, and prevents bags and luggage, sports equipment, and cargo on the back of a vehicle, and prevents bags and luggage from taking up room inside the vehicle. The device eliminates the hassle associated with traditional hitches and complicated tie-down straps, and can be easily tucked away under the vehicle when not in use.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle mounted cargo carrier adapted to be supported from a cargo hitch receiver, comprising:
    a T-shaped member having a trailer hitch tube and a crossbar member, said crossbar member comprising a pair of support member ends;
    said support member ends each comprising a slat member receiving sleeve and a bar member receiving sleeve;
    a first and second elongated bar member, each being adapted to be slidably received by said bar member receiving sleeve;
    a first and second elongated slat member, each being adapted to be slidably received by said slat member receiving sleeve;
    a sleeve fastening aperture through each slat member receiving sleeve and bar member receiving sleeve;
    a fastener for each sleeve fastening aperture, whereby said fastener is adapted to secure said slat members and bar members within said slat member receiving sleeve and said bar member receiving sleeve, respectively; and
    a cover plate secured to said crossbar member via a hinge joint, whereby said cover plate is rotatable from an upstanding configuration to a horizontal configuration, said cover plate shrouding said crossbar member when in said upstanding configuration.

2. The vehicle mounted cargo carrier of claim 1, wherein:
    said first and second elongated slat member having at least one slat member aperture therethrough;
    said fastener further comprising a magnetic member and a pin, said magnetic member being magnetically attracted to said slat receiving sleeve;
    said fastener adapted to be positioned through said sleeve fastening aperture of said slat receiving sleeve and through said slat member aperture when aligned.

3. The vehicle mounted cargo carrier of claim 1, wherein:
said first and second elongated bar member having at least one bar member aperture therethrough;
said fastener further comprising a magnetic member and a pin, said magnetic member being magnetically attracted to said bar receiving sleeve;
said fastener adapted to be positioned through said sleeve fastening aperture of said bar receiving sleeve and through said bar member aperture when aligned.

4. The vehicle mounted cargo carrier of claim 1, wherein:
said fastener further comprising hand turn threaded fastener;
said sleeve fastening aperture further comprising a tapped aperture adapted to receive said hand turn threaded fastener;
said hand turn threaded fastener adapted to be positioned through said tapped aperture of said bar receiving sleeve and secure said bar member therein.

5. The vehicle mounted cargo carrier of claim 1, wherein:
said crossbar member further comprises an upper surface adapted to receive and secure said slat members thereon when not in use;
said first and second elongated slat member having at least one slat member aperture therethrough;
said upper surface of said cross member further comprising upstanding pins securable through said slat member apertures.

6. The vehicle mounted cargo carrier of claim 1, wherein:
said crossbar member further comprises an upper surface adapted to receive and secure said slat members thereon when not in use;
said first and second elongated slat member having at least one slat member aperture therethrough and adapted to receive said fasteners;
said upper surface of said cross member further comprising crossbar member fastening apertures therethrough adapted to receive said fasteners.

7. The vehicle mounted cargo carrier of claim 1, wherein said cross bar member further comprises cargo tie down loops thereon.

8. The vehicle mounted cargo carrier of claim 1, wherein:
said slat members are adapted to be slidably received by slat receiving cargo sleeves attached to the base of a cargo item;
said slat receiving cargo sleeves comprising elongated and tubular bar members.

9. The vehicle mounted cargo carrier of claim 1, further comprising:
a cargo tray attachment comprising a cargo tray and a first and second cargo tray bar member;
said first and second cargo tray bar member being adapted to be received by said bar member receiving sleeves of said crossbar.

10. The vehicle mounted cargo carrier of claim 1, wherein:
said hitch tube is adapted to slidably engage a hitch receiver and is attached thereto via a chain;
said chain being secured to said crossbar at one end and to said hitch at an opposite end.

11. The vehicle mounted cargo carrier of claim 1, further comprising:
a hand turn fastener through said hitch for securing said hitch tube in a static position therein.

* * * * *